US008880697B1

(12) United States Patent
Liu et al.

(10) Patent No.: US 8,880,697 B1
(45) Date of Patent: Nov. 4, 2014

(54) USING RULES TO DETERMINE USER LISTS

(75) Inventors: Xun Liu, Foster City, CA (US); Anurag Agarwal, Sunnyvale, CA (US); Raghava Hassan Nanjunda Swamy, Sunnyvale, CA (US); Rajas Moonka, San Ramon, CA (US)

(73) Assignee: Google Inc., Mountain View, CA (US)

( * ) Notice: Subject to any disclaimer, the term of this patent is extended or adjusted under 35 U.S.C. 154(b) by 94 days.

(21) Appl. No.: 13/442,598

(22) Filed: Apr. 9, 2012

(51) Int. Cl.
*G06F 15/173* (2006.01)
*G06F 15/16* (2006.01)
*G06F 17/30* (2006.01)

(52) U.S. Cl.
USPC .......................... 709/225; 709/201; 707/748

(58) Field of Classification Search
CPC .............. H04L 29/06; H04L 29/08072; H04L 29/0809; H04L 29/08144; H04L 63/08
USPC ............................................. 709/225; 707/50
See application file for complete search history.

(56) References Cited

U.S. PATENT DOCUMENTS

| | | | |
|---|---|---|---|
| 5,627,764 A | 5/1997 | Schutzman et al. | |
| 7,299,201 B2 | 11/2007 | Jammes et al. | |
| 7,337,127 B1 * | 2/2008 | Smith et al. | 705/14.66 |
| 7,543,740 B2 * | 6/2009 | Greene et al. | 235/380 |
| 7,561,537 B2 | 7/2009 | Schrader et al. | |
| 7,809,740 B2 * | 10/2010 | Chung et al. | 707/758 |
| 2002/0082923 A1 | 6/2002 | Merriman et al. | |
| 2003/0158777 A1 | 8/2003 | Schiff et al. | |
| 2004/0060002 A1 | 3/2004 | Lucovsky et al. | |
| 2004/0215703 A1 | 10/2004 | Song et al. | |
| 2005/0027581 A1 | 2/2005 | Kjesbu et al. | |
| 2005/0174951 A1 | 8/2005 | Schrader et al. | |
| 2007/0079283 A1 | 4/2007 | Kuninobu et al. | |
| 2007/0260596 A1 * | 11/2007 | Koran et al. | 707/5 |
| 2008/0010148 A1 | 1/2008 | Knibiehly et al. | |
| 2008/0040217 A1 * | 2/2008 | Dellovo | 705/14 |
| 2008/0199042 A1 * | 8/2008 | Smith | 382/100 |
| 2009/0254572 A1 | 10/2009 | Redlich et al. | |
| 2010/0015993 A1 * | 1/2010 | Dingler et al. | 455/456.1 |
| 2010/0174775 A1 | 7/2010 | Saiki | |
| 2010/0211464 A1 * | 8/2010 | Zhu et al. | 705/14.53 |
| 2011/0251896 A1 * | 10/2011 | Impollonia et al. | 705/14.55 |
| 2011/0276908 A1 | 11/2011 | O'Riordan | |
| 2012/0011095 A1 | 1/2012 | Ahrens et al. | |
| 2012/0173692 A1 | 7/2012 | Lakes et al. | |

OTHER PUBLICATIONS

IEEE Spectrum Reader Service Card, May 1970 [online] IEEE [retrieved Aug. 28, 2013]. Retrieved from the Internet: <URL: http://ieeexplore.ieee.org/stamp/stamp.jsp?arnumber=05213356>.*
A. Barth, HTTP State Management Mechanism, Internet Engineering Task Force (IETF) [online], Apr. 2011 [retrieved on Sep. 4, 2013]. Retrieved from the internet: <http://tools.ietf.org/html/rfc6265>.*

(Continued)

*Primary Examiner* — Vivek Srivastava
*Assistant Examiner* — Hermon Asres
(74) *Attorney, Agent, or Firm* — Fish & Richardson P.C.

(57) ABSTRACT

Methods, systems, and apparatus, including computer programs encoded on computer storage media, for receiving data including a user identifier associated with a user and one or more key-value pairs associated with the user's access of a resource. Each key-value pair includes a key and a value provided by the resource. Upon determining that the received data satisfies one or more rules associated with a user list comprising user identifiers, the user identifier is added to the user list.

30 Claims, 6 Drawing Sheets

(56) References Cited

OTHER PUBLICATIONS

IEEE Spectrum Reader Service Card, May 1970 [online] IEEE [retrieved Aug. 28, 2013]. Retrieved from the Internet: <url: http://ieeexplore.ieee.org/stamp/stamp.jsp?arnu mber=05213356>.*

W.J.E. Crissy and Gary A. Maple, What Abourt Reader Service Cards, Journal of Marketing, vol. 27, No. 1, Jan. 1963, pp. 56-60.*

IEEE Spectrum Reader Service Card, May 1970 [online] IEEE [retrieved Aug. 28, 2013]. Retrieved from the Internet: <url: http://ieeexplore. ieee.org/stamp/stamp.jsp?arnu mber=05213356>.*

A. Barth, HTTP State Management Mechanism, Internet Engineering Task Force (IETF) [online], Apr. 2011 [retrieved on W Sep. 4, 2013]. Retrieved from the internet:< http://tools.ietf.org/html/rfc6265>.*

Chatfield, Dean C. et al., "XML-Based Supply Chain Simulation Modeling", *Proceedings of the 2004 Winter Simulation Conference*, 2004, 1485-1493 (9 pages).

Rosenauer, Gregor B., "A Standards-Based Approach to Dynamic Tool Integration Using Java Business Integration-A Redesign of the ToolNet Framework built on Enterprise Integration Standards", Oct. 2008 (266 pages).

van Zwol, Roelof et al., "DXL: Data eXchange Language", *University of Twente, Centre for Telematics and Information Technology*, 2001 (17 pages).

van Zwol, Roelof, "Modelling and searching web-based document collections", Apr. 2002 (202 pages).

van Zwol, Roelof et al., "Webspace query formulation: an overview", *University of Twente, Centre for Telematics and Information Technology*, 2001 (14 pages).

\* cited by examiner

USING RULES TO DETERMINE USER LISTS

BACKGROUND

This specification relates to online content distribution.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

A publisher's web page may have multiple slots, e.g., for displaying content items, such as advertisements, on the publisher's web page. Each of the slots can have associated publisher-specified parameters by which eligible content items are to be selected to fill the slots. Example parameters can be related to the size of the slot, the content format (e.g., one or more of text, image, video, etc.), the content type (e.g., dogs, vacations, sports, etc.) and/or other parameters.

Content items can be selected for presentation to a user based on, among other things, previous behavior. A web page may include code, such as in the form of a small transparent image, that causes a browser to convey information to a server upon requesting the image. The conveyed information can be used for various purposes, such as in selecting content for presentation to a viewing entity.

SUMMARY

In general, one innovative aspect of the subject matter described in this specification can be embodied in methods that include the actions of receiving data including a user identifier associated with a user and one or more key-value pairs associated with the user's access of a resource, each key-value pair including a key and a value provided by the resource; determining that the received data satisfies one or more rules associated with a user list comprising user identifiers; and adding the user identifier is to the user list based on the determination. The key-value pair may be specified by a sponsor of the resource.

Methods may further include the actions of receiving instructions from a sponsor of the resource to modify the one or more rules associated with the user list; generating modified rules based on the received instructions; and determining whether to remove the user identifier associated with the received data from the user list based on whether the received data satisfies the modified rules. The resource may include content served over the Internet, and the key-value pairs may be defined with the source code of the resource. The received data may be included within a client request for content associated with the resource.

Methods may further include the actions of receiving a request for content, the request associated with a user identifier; determining that the user identifier is included in the user list; and selecting and serving content based on determining that the user identifier is included in the user list.

Other embodiments of this aspect may include the actions of receiving data, the received data including a user identifier associated with a user and one or more key-value pairs associated with the user's access of a resource, each key-value pair including a key and a value provided by the resource; and generating and storing a value for an attribute associated with the user identifier, the attribute storing one or more values associated with the user identifier based on applying one or more rules to specified key-value pairs. The value of the attribute may represent a number of times the user has accessed the resource within a predetermined period of time, or may represent a category of resources accessed by the user.

The foregoing and other embodiments can each optionally include one or more of the following features, alone or in combination. Items may be kept on the user list only until a timestamp associated with the received data exceeds a threshold age. The threshold age may be a predetermined threshold value associated with the user list.

Particular embodiments of the subject matter described in this specification can be implemented so as to realize none, one or more of the following advantages. Customer groups may be segmented more efficiently. Remarketing lists may more accurately reflect the advertiser's preferences.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Web pages and other online resources (e.g. videos, sound files, images, applications) visited by a user can indicate the interests of a given user. For example, a user who is visiting a web page featuring shoes may be more interested than other users in content items, such as advertisements, relating to footwear. Systems can provide content to users based, at least in part, on these interests. For example, a remarketing campaign can be run so as to provide users with advertisements based at least in part on web pages that they have recently visited.

A smart pixel can be included in a resource. The smart pixel can include code that, when executed, causes a browser to, among other things, pass information to a service. The information passed can be determined by an owner/custodian of the resource. For example, when a user accesses a resource, the user's browser can process a smart pixel included therein and send data to a server. The data can be of the form of key-value pairs, where the key indicates a category or type of data and the value represents the respective value for the data type that is passed. The information passed to the server can include data selected by the content owner of the page, including custom key-value pairs. The data, including the custom key-value pairs, can be sent to, for example, a marketing server that maintains customer records and remarketing lists.

User attribute rules can be associated with a given content owner/resource. The user attribute rules can be stored in a datastore that is accessible by the marketing server. User attribute rules can be used to add a given user to one or more lists. The lists can be of the form of remarketing lists. Using the lists, a content owner can remarket to limited groups of users exhibiting specific behaviors, such as users that visit web pages devoted to particular products, services, or other content.

This disclosure uses the terms "content owner", and "sponsor" interchangeably to refer to the entities that define the custom key-value pairs, as well as specify user attributes and user lists based on rules referencing and evaluating those key-value pairs.

Figure 1:
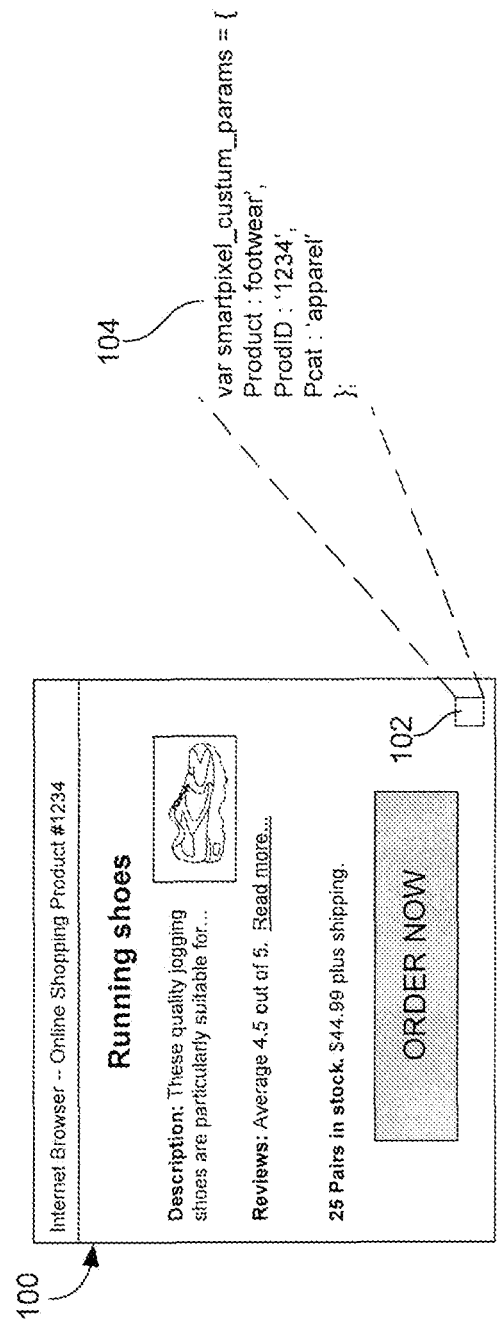
FIG. 1 is an illustration of a web page.

FIG. 1 shows an illustration of an example web page 100. The web page 100 is a retail page providing information about a retail product, in this case running shoes. In order to record visits to the web page 100 by customers, the web page 100 includes a smart pixel 102. The smart pixel 102 can be of the form of a single pixel transparent image that includes code (i.e., code 104) designed to convey information to a server. A portion of the code 104 representing the smart pixel 102 is shown.

The code 104 includes data that define key-value pairs associated with the web page 100. In the example shown, three key value pairs have been specified for this smart pixel: the attribute "Product" is given the value "footwear", the attribute "ProdID" has the value "1234", and the attribute "Pcat" has the value "apparel".

Figure 2:
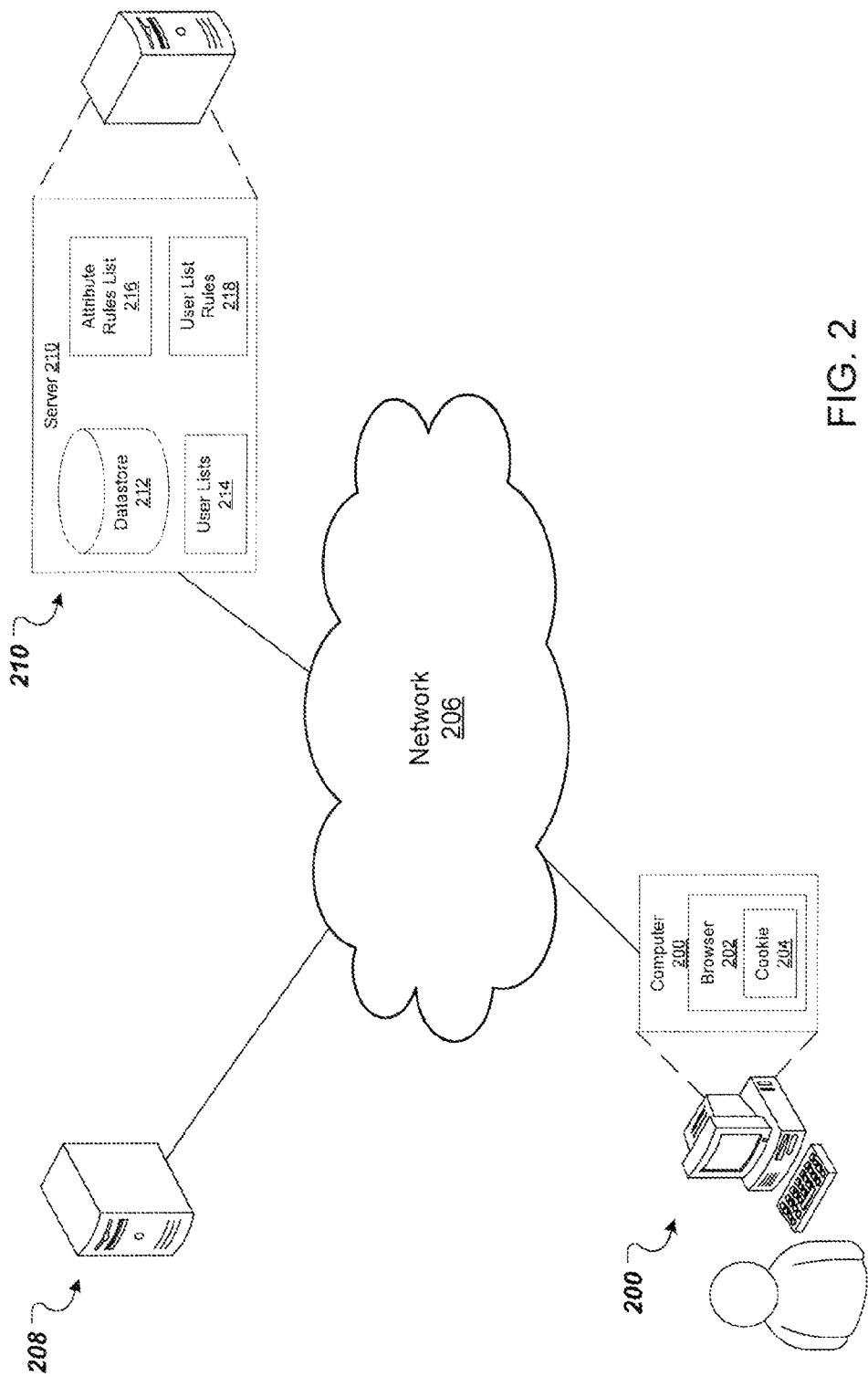
FIG. 2 is a block diagram that illustrates an example system in which Internet browsing activity can be used to assist in content item distribution.

FIG. 2 is a block diagram that illustrates an example system for use in content item distribution. A user's device (e.g., computer 200) includes a browser 202. The browser 202 includes a cookie 204 that represents information about the user's computer 200 and/or browser 202 and/or other information. The browser 202 is configured to access resources over a network 206, which may be a local wired or wireless network, or may be a larger network such as the Internet. The browser 202 requests resources from servers over the network 206 in order to present the resources to the user.

When a resource is accessed, such as the web page 100 shown in FIG. 1, a request is sent by the browser 202 to a server 208 associated with a resource sponsor that hosts the resource. Responsive to the request, the resource is returned to the device and ultimately presented in a user interface associated with the browser 202. For web page 100 shown in FIG. 1, the browser 202 will encounter the smart pixel 102 when processing the received resource. Processing the smart pixel 102 includes sending information to server 210. More specifically, smart pixel 102 includes code that when executed (i.e., fires) results in a transmission of information to the server 210. The information transmitted can be of the form of a request that includes various data. Example data includes the identification of the resource, one or more key-value pairs, and other data (such as data related to cookie 204). As noted above, what data is transmitted in the request can be specified by the resource sponsor. The data transmitted can be specified by the smart pixel 102. Code associated with the smart pixel 102 can, when executed, gather information for transmission as part of the request including gathering data from other portions of the resource or from, for example cookie 204.

The server 210 includes a plurality of records stored in a datastore 212. A record can be created at the time that information is received in association with a smart pixel firing (i.e., in response to an event). That is, a record can be created that stores information passed as a result of the processing of a smart pixel. Each record can be indexed by a user identifier, such as included in or defined by the cookie 204. Data in a record can include the information passed including the key-value pairs passed. In essence, a record reflects that data which a given resource sponsor wants to store as a result of receipt and processing of one or more events associated with the presentation of a resource to a given user. When the user accesses the resource, the key-value pairs specified by the resource sponsor (i.e., using the smart pixel) are associated with a given user and passed as an event. Notice of an event is received at server 210 and one or more records can be stored. Whether a record is stored depends on another data structure stored in association with server 210, namely, based on attribute rules associated with a received event.

Server 210 further includes attribute rules list 216. Attribute rules list 216 can include a plurality of records. A record in the attributes rules list 216 can be associated with a resource sponsor or with a particular resource. A record in the attributes rules list 216 includes one or more attribute rules that are specified by a given resource sponsor. In some implementations, the attribute rules for a given resource/resource sponsor are evaluated at the time data associated with an event is received. That is, when data associated with an event is received, rules associated with a given resource/resource sponsor are identified in the attributes rules list 216. The identified rules can then be evaluated, for example, using information received as a result of the event (e.g., a smart pixel firing as described above). When the rules are evaluated, one or more attributes may be identified, and stored as a record in datastore 212. In some implementations, an attribute includes a name and a set of values, with each value being associated with a timestamp. Each value may be a value based on evaluating a given rule in the attribute rules for a given resource/sponsor using data received in association with an event. In some implementations, an attribute value may be simply the value returned as part of a key-value pair. Evaluating attribute rules is discussed in greater detail below.

In the example shown, server 210 further includes user lists 214. A user list can be associated with a topic or subject and includes one or more records. The topic or subject defines the characteristics that qualify a user to be included in a given user list. In some implementations, user lists can be used to assist in distributing content to users included therein. User lists are described in greater detail below. Server 210 further includes user list rules 218. User list rules 218 can include a plurality of records. A record in the user list rules 218 can be associated with a sponsor associated with a user list. In some implementations, the sponsor of a user list can be a sponsor of one or more resources. A record in the user list rules 218 includes one or more user list rules that can be evaluated in order to determine whether users should be added to one or more lists of the user lists 214. That is, when data associated with an event is received, and attributes associated with users are updated, the user list rules can be evaluated to determine whether one or more users should be added to/removed from one or more lists in the user lists. Adding and/or removing users from user lists is described in greater detail below.

Figure 3:
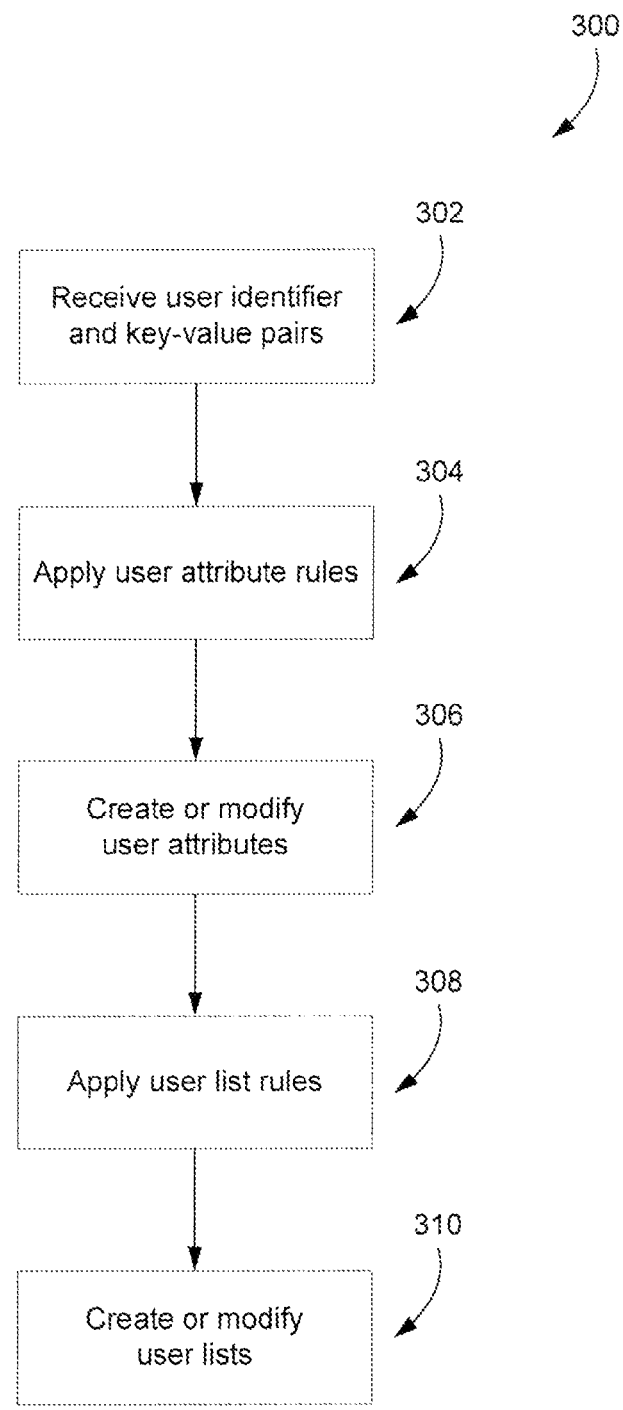
FIG. 3 is a flowchart representing an example process by which content item distribution lists can be generated.

FIG. 3 is a flowchart representing an example process 300 by which content item distribution lists can be generated. The example process is described in relation to elements shown in FIGS. 1 and 2 by way of example. Other systems or components may perform steps in the process.

Information is received including key-value pairs specified by a resource sponsor (302). The information can be received as a result of an event. The event can relate to the firing of a pixel, such as smart pixel 102. The event can result in the receipt of a request, such as a resource request, at server 210. The request can include a user identifier, such as a user identifier associated with cookie 204. As described above, a resource request (e.g., web page visit), can result in the processing of smart pixel 102 and the transmission of data (e.g., the cookie and the key-value pairs) to the server 210. Other data may be received, such as an identifier for the resource (e.g., a uniform resource locator URL associated with the resource) and a time stamp.

As described above, the received key-value pairs may be uniquely selected and defined by the resource sponsor, such as to facilitate the generation of content distribution lists and the serving of relevant content. For example, where the smart pixel is placed on a retail product page, the key-value pairs may reflect information about the product featured on the page (e.g., (Product: product ID) pair, (Product: product price) pair or other pairs). As another example, where the pixel is placed on a check-out page, the key-value pairs may instead reflect information about the user's purchase (e.g., (order: price) pair or (order: shipping price) pair). A search results page may include a smart pixel with key-value pairs reflecting the user's search criteria (e.g., (keyvalue: search term) pair). Other examples of key-value pairs are possible.

One or more user attribute rules are applied (304). For example, user attribute rules associated with a given resource/resource sponsor can be identified from user attribute rules list 216. Evaluation of the identified rules can result in the storage of an attribute for a user as a record in datastore 212. For example, each user attribute rule can be evaluated to determine whether to store a value for that attribute for the user based on the received event. In some implementations, an unfamiliar user identifier may result in a new record being created.

As described above, user attribute rules are specified by the resource sponsor and can specify whether to record a value for a given attribute for a user in the datastore 212. For example, a user attribute can be associated with a user visiting a resource (e.g., a product web page). Each visit can be an event (e.g., the user viewed the product page). A count associated with the visits can be recorded (e.g., an attribute of visitor to product page X can be updated at each occurrence including a time stamp associated with each visit, a last visit or other construct). Once a user exceeds a certain threshold of visits (including zero), the user may be included in a user list. User lists are described in greater detail below.

User attributes are created and/or modified in accordance with the application of the user attribute rules (306). User attributes form the basic unit of storage for the datastore 212.

In some implementations, each attribute includes a name and a set of values, with each value being associated with a timestamp. A rule may define a Boolean operation to be applied to received event data. Each value may be based on evaluating the rules associated with the attribute, or alternatively may be a result of those rules. In some implementations, an attribute value may be simply the value returned as part of a key-value pair.

The storage of attributes may be themselves governed by one or more rules (e.g., additional rules in the user rules attributes 216). In some implementations, a user attribute may also include a limit as to the number and longevity of values stored. For example, when the user attribute rules are evaluated, previous values stored for an attribute that are too old may be cleared from the attribute (e.g., remove an indication of a visit to a product page when it is older than 7 days), and the oldest values may be cleared if too many total values exist (e.g., only store values for the most recent 5 events).

The number and longevity limits for each user attribute may be customized by the resource sponsor. Certain user attributes can be selected to retain values only as long as is necessary for the use of that attribute; for example, an attribute that is used to store information about events over the last week may only retain values with timestamps less than a week old.

Having updated the user attributes on the basis of the receipt of new event data, user list rules are applied to the records (308). As described above, the user list rules 218 may be defined by the resource sponsor according to particular preferences for content distribution. The user lists 214 can be stored in user list rules 218.

As described above a user list includes a topic/category and a list of users that satisfy the topic/category. Evaluation of a user list rule 218 can result in the addition/removal of a user from a respective user list. The application of the user list rules 218 can include evaluating the attributes associated with a particular user (e.g., as stored in the attributes of datastore 212 for a given user) to determine whether the user should be added/removed from a particular user list. A user list rule may be as simple as specifying that a particular user attribute must store a particular value for the user identifier to be included on the user list. Other more complicated rules are possible, including rules that specify combinations of attributes that must be present in order to qualify for inclusion on a given user list 214. For example, the user list rules 218 themselves may be more complex, and may refer to other lists (e.g., require that the user be included in another list) as well as user attributes and other available data.

In some implementations, a user list may relate to a particular key-value pair. Such a user list rule's expression may be limited to only evaluating key-value pairs against strings or numerical values received, and the expression may evaluate to a true or false result. If the user event returns one or more key-value pairs that cause the expression to evaluate to TRUE, the user identifier may be added to the user list without involving user attributes at all. To avoid complications, the use of a key-value pair in this way may be strictly limited. For example, in some implementations, only the current user event may be used. More complex rules, such as those requiring multiple user events, may require user attributes.

A new user list is created, or an existing user list modified, based on the evaluation of the user list rules (310). Like the user attributes, each user list may also have a maximum age after which results are removed. In some implementations, each user identifier on the user list may have an associated timestamp, which may represent when the user identifier was added to the list or the most recent time that a re-evaluation of the user list rule for that user identifier confirmed it belongs to the list.

In some implementations, each user identifier on the user list may have a timestamp that equals a timestamp associated with a user attribute referenced in the user list rule (e.g., a timestamp associated with a most recent event, or an oldest event which resulted in the qualification of the user to be included in the user list).

Periodically, the user list may be checked to remove or validate entries with timestamps older than the allowed expiration. This check may occur at regular intervals, whenever the list is modified by receipt of additional data, or whenever the list is to be used for content distribution or otherwise referenced.

Figure 4:
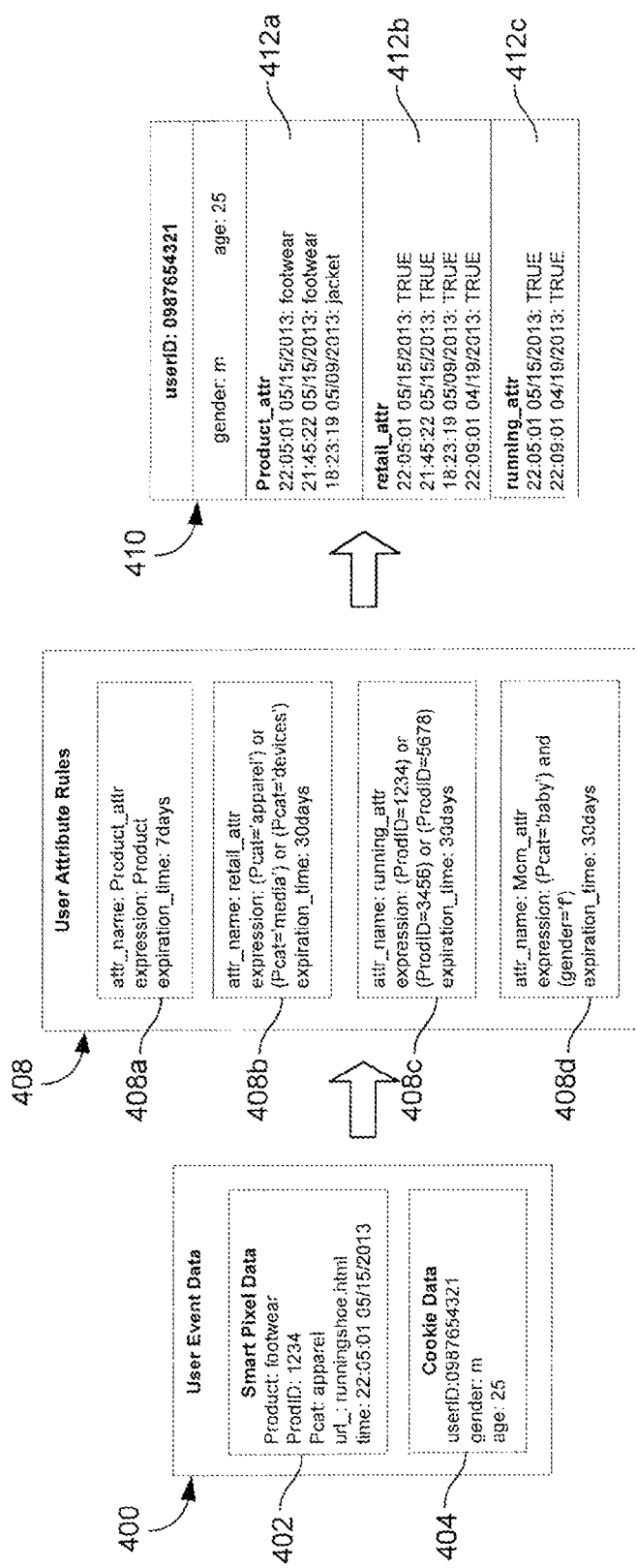
FIG. 4 illustrates an example process for applying rules to received data.

FIG. 4 shows an example of received data resulting in an updated record. Here, user event data 400 includes both smart pixel data 402 and cookie data 404, as described above in reference to FIG. 1. The smart pixel data 402 includes a product type "footwear", a product ID number "1234", a product category "apparel", a URL "runningshoe.html", and a timestamp. The smart pixel data 402 is specific to the user event, such as visiting the specific web page "runningshoe.html", that resulted in the data transmission.

Although the URL is shown as a page name, it will be understood that the full URL name, including the domain, may be included. The specific format of any of these fields will depend on the breadth of the application and the information necessary for the system to properly process received data.

The cookie data 404 may provide data about the user that is not specific to the event, such as the user's gender and age. The cookie data 404 may also include geographic information about the user, information about the user's device such as the user's operating system and browser, and other demographic information useful for selective content distribution.

The systems and techniques described here may, in appropriate instances, be provided with mechanisms by which users may be informed about and control information that is collected about their use of the systems. For example, in certain implementations, it may be appropriate to provide users with the opportunity to view the types of information collected, and to permit users to opt in or opt out of various systems that may collect information. Also, the storage of information by the systems may, in certain circumstances, be limited to certain time frames, such as storing information only for a predetermined number of hours/days/months. Moreover, information that is stored and/or provided to third parties may be aggregated prior to any sharing or otherwise anonymized or affected so as to remove personally identifiable information from the data. The particular approaches that are employed with respect to user data may vary depending on the type of data and the type of services being provided, recognizing that in some circumstances, such steps may limit the usability of such systems by a user.

The data 400 is evaluated against user attribute rules 408. Each rule 408 gives an attribute name, which represents the variable name under which the attribute value is stored. As shown, each attribute may include a common suffix ("_attr") in order to clarify the use of an attribute name in further processing or to distinguish attribute names from key and list names, but such a distinction is not necessary in all implementations.

Each attribute rule 408 defines an expression that determines what value will be stored to an attribute, if any. The expression refers to keys and other data that are used to evaluate each user attribute, and the result of the expression is the value that is stored with the attribute for the current event timestamp.

Each attribute rule 408 also has an expiration time, which may default to 30 days but may be customizable to be longer or shorter as needed for any specific user attribute. Timestamps for events or attributes representing ages older than the expiration time may result in a failure to store an attribute or removal of an existing attribute. For purposes of the examples shown in FIGS. 4 and 5, the timestamp associated with the user event is assumed to approximately reflect the time at which the evaluation takes place (that is, the "current time" for purposes of the example is shortly after 10 pm on May 15, 2013).

Four rules 408 are shown in the example illustrated by FIG. 4. A rule 408a for the user attribute "Product_attr" stores the value associated with the custom key-value pair that has "Product" as its key. It has a shortened expiration of 7 days, which means that events and attributes more than a week old should no longer be stored under this user attribute.

In some implementations, including the present example, if an expression refers to a key that was not returned as a key-value pair at all, then the user attribute does not record a value for the event. In other implementations, a NULL or other neutral value may be stored.

A rule 408b for the user attribute "retail_attr" stores a Boolean value of TRUE when the product category is one of the three retail categories tracked by the advertiser: 'apparel', 'media', or 'devices'.

In some implementations, including the present example, if a Boolean expression evaluates to FALSE, no value is recorded for the user attribute. In other implementations, FALSE or another negative value may be stored.

A rule 408c for the user attribute "running_attr" stores a Boolean value of TRUE when the product ID matches one of the three product IDs that the content owner has identified as a running product.

A rule 408d for the user attribute "Mom_attr" stores a Boolean value of TRUE when the product category represents a 'baby' product and when the value of the gender variable associated with the user identifier is 'female'.

A record 410 having user attributes 412a-c is updated as shown. The expression of the rule 408a is evaluated to 'footwear', which is then stored as a value under the "Product_attr" attribute 412a with the timestamp of the event. The expression of the rule 408b is evaluated to TRUE, which is then stored as a value under the "retail_attr" attribute 412b with the timestamp of the event. The expression of the rule 408c is evaluated to TRUE, which is then stored as a value under the "running_attr" attribute 412c with the timestamp of the event. The expression of the rule 408d is evaluated to FALSE, and so is not stored. In fact, a "Mom_attr" user attribute is not shown within this customer record 410 because the expression of this attribute rule has never evaluated to TRUE (and assuming that the gender of the user continues to show as male, it will continue to evaluate to FALSE).

Figure 5:
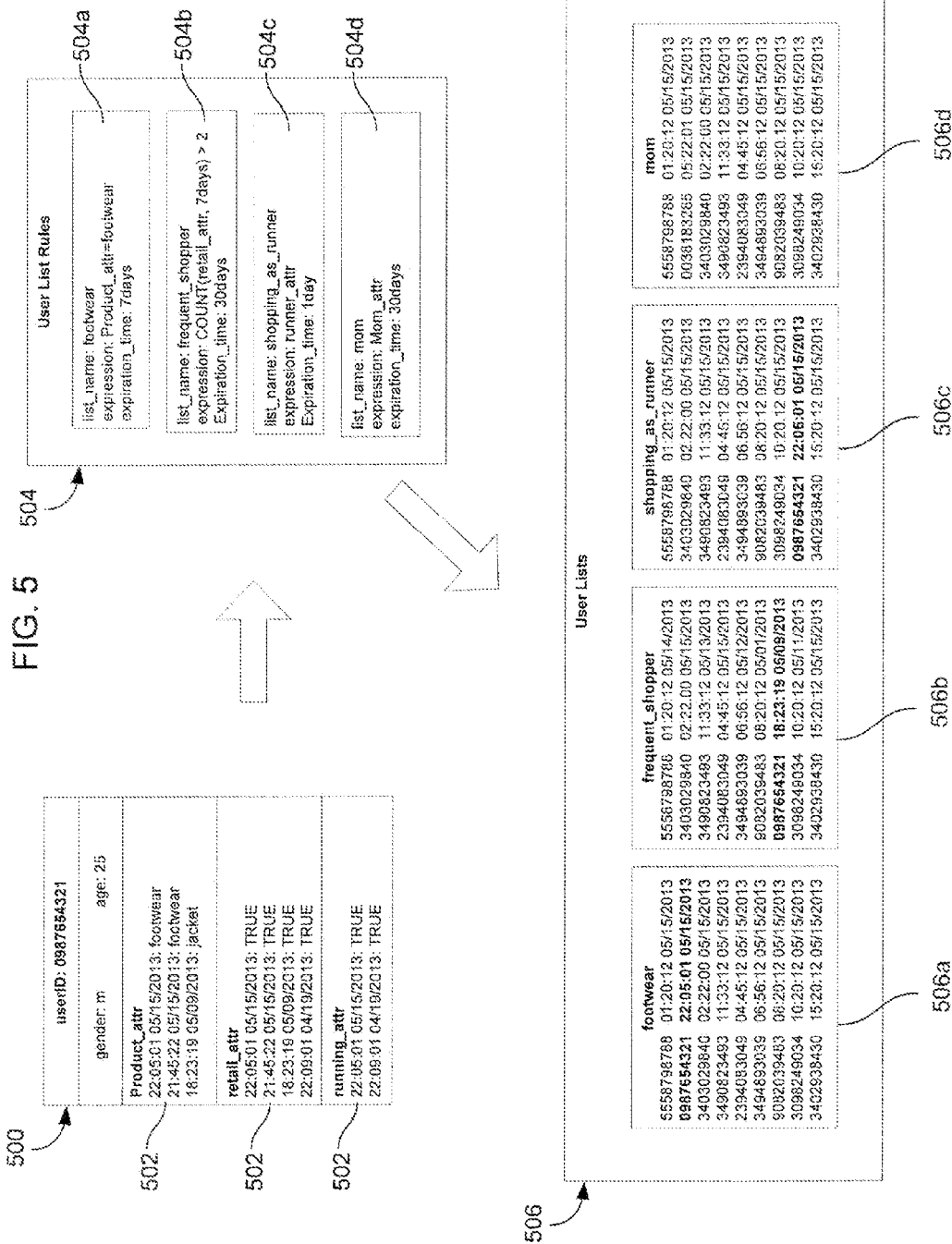
FIG. 5 illustrates an example process for generating content item distribution lists.

FIG. 5 illustrates how a record can be used with user list rules in order to modify user lists.

As shown above with respect to customer record 410, a customer record 500 includes user attributes 502, each of which may have multiple values with timestamps reflecting different user events that resulted in data being recorded. The same three user attributes are shown as in FIG. 4, each with multiple values.

The user attributes 502 are used as the basis for evaluating user list rules 504 in order to determine whether the user identifier associated with the record 500 should be included on any of the user lists 506. As explained above, each of these user list rules may be defined by the resource sponsor in accordance with what user lists the resource sponsor wishes to use for content distribution purposes.

Each user list rule 504 includes a list name, which specifies the list onto which the user identifier may be added. No suffix is shown for list names, but list names may conform to certain special naming rules in some implementations.

Each user list rule 504 has an expression that references one or more user attributes. Each expression evaluates to a result (e.g., true/false), which determines whether or not the user identifier associated with the record 500 should be added to the user list 506. Where the attribute itself is a value, the expression may consist of just a simple reference to the attribute, but further equivalency tests and other evaluations may be used.

Each user list rule 504 may further include an expiration time, which as above may default to 30 days or some other standard period but may be customizable as appropriate. Where expressions are evaluated from attributes with timestamps older than the allowed expiration time, the user identifier is not added to the user list even if the expression evaluates to TRUE. As the user identifiers themselves are added with their timestamps, each user identifier may also be removed when the timestamp is no longer within the expiration time.

Four user list rules 504 are included in the example of FIG. 5, and each of them is associated with a related user list 506.

A user list rule 504a for the list "footwear" evaluates to TRUE when the attribute "Product_attr" has a value of 'footwear'. The expiration time for this list is seven days.

The most recent value for "Product_attr" is 'footwear', which causes this user list rule 504a to evaluate to TRUE. Because this user list rule 504a evaluates to TRUE, the user identifier associated with the record 500 is added to the "footwear" user list 506a, with a timestamp matching the most recent value of "Product_attr" that evaluates to true.

A user list rule 504b for the list "frequent_shopper" evaluates to TRUE when the expression "COUNT(retail_attr, 7 days)>2" is met. The function COUNT can be used to determine the number of values that a given attribute has with timestamps in a certain period. In this case, the "frequent shopper" list has an expression that requires more than two values for the "retail_attr" attribute within the last seven days. This represents a record of user events including visits to web pages for retail products at least three times in the last week, behavior which the resource sponsor has chosen to identify as characteristic of a frequent shopper.

In this case, the "retail_attr" attribute 502 for the record 500 includes three values with timestamps within the last seven days. Because the expression for the user list rule 504b evaluates to TRUE, the user identifier is added to the user list 506b. Because multiple values of the "retail_attr" attribute 502 are necessary to satisfy the expression, the timestamp of the oldest of the three identified values is used as the timestamp of the user identifier within the user list 506b. Because the user list rule 504b specifies an expiration time of 30 days, the user will remain on the frequent shopper list for a month following the earliest of the purchases used to add the user identifier to the user list as a frequent shopper. Although in the case of the "frequent_shopper" user list 506b an older timestamp is used, it will be understood that in some implementations the event shown as an example in FIG. 5 would result in the most recent timestamp being recorded on the user list 506b instead.

A user list rule 504c for the list "shopping_as_runner" simply calls the attribute "running_attr" for its expression, with a particularly short expiration time of only one day. Any user identifier associated with a "running_attr" attribute 502 with a value of TRUE will therefore also be put on the "shopping_as_runner" user list 506c, but only for a day after the event occurs. This user list will therefore reflect only user identifiers associated with current shopping events for running products, allowing for responsive content distribution to those users.

Because the record 500 has a "running_attr" attribute less than a day old, the user identifier is added to the "shopping_as_runner" user list 506c. As shown, all of the user identifiers on the "shopping_as_runner" user list 506c have timestamps less than a day old.

A user list rule 504d for the list "mom" simply called the attribute "mom_attr" for its expression, which means that like the "shopping_as_runner" user list 506c, the "mom" user list 506d will be populated by all those users with "mom" user attributes that have TRUE values. This allows the resource sponsor to distribute content relevant to users sharing characteristics with moms and who are more likely to respond positively to content related to that characteristic.

Recognizing that, in some implementations, the resource sponsor decides which attributes to evaluate and what user lists to create, it will be understood that the names and designations need not be literally correct. For example, not all users associated with user identifiers on the "mom" user list 506d will actually be moms; aunts, grandmothers, and other shoppers for baby items may be associated with user identifiers on the "moms" list. What attributes to monitor and how to use those attributes to populate user lists are both left to the discretion of the resource sponsor.

In this example, the record 500 does not include the "mom_attr" user attribute because the related user attribute rule has not evaluated to TRUE for this record; therefore, the user identifier is not added to the "mom" user list 506d. In some implementations, the "mom_attr" attribute may exist as part of the record 500 but may not have any values, or may exist and have only FALSE values. In these cases, the user identifier would still not be added to the "mom" user list 506d.

In addition to the COUNT function mentioned above, a variety of functions may be allowed for the resource sponsor-specified attribute rules and list rules. Several example functions are described briefly below; other functions and other tools to manipulate the custom parameters, attributes, and lists as described herein may be known to one skilled in the art.

The functions HAS_SUBSTR, HAS_PREFIX, and HAS_SUFFIX allow for the Boolean evaluation of strings. Each takes two strings as arguments and evaluates if one string is a substring, prefix, or suffix of the other respectively. This can be used to evaluate portions of the event URL (such as determining if a URL has the substring "checkout" in it anywhere to identify shopping cart checkout pages) or to normalize data (such as determining if a gender string has the prefix 'm' in it so that both of the values 'm' and 'male' are counted).

The function NUMBER converts a string to a number value.

The function SUBSTRING returns a specified substring of a string.

The function DATE returns the current date and time, or standardizes a given date and time by supplying missing components. It may assume the current day, a default time zone, and a default time for values not given.

The function MATCH allows for the evaluation of strings against regular expressions.

The function IF allows for the return of alternate values according to whether an expression evaluates to TRUE or to FALSE.

The function IS_NULL tests whether an expression evaluates to null.

The function SUM takes an attribute with number values and a time intervals, and sums all of the values of the attribute within the specified interval.

The function URL_PARAM takes a url with a key-value pair and a key and returns the value. For example, URL_PARAM('http://example.com/search?q=book', 'q') would return 'book'.

The function SIZE takes a list and returns the number of elements in the list.

The function SPLIT takes a Boolean expression, splits it, and returns a specified part of the split.

The function EXTRACT takes a string and a regular expression and returns the substring matching the regular expression.

The function TIMESTAMP takes an attribute and returns the most recent timestamp for a value of that attribute.

The function SELECT, similar to an SQL select statement, takes an attribute and a where-clause and returns the attribute values that satisfy the where-clause.

The function UNIQUE de-duplicates the values of an attribute, keeping only the most recent copy of each different value for the attribute.

The function FLATTEN takes an attribute that is a string list with multiple strings sharing the same value element for the string list, and flattens it so that each value element with a designated timestamp has one string in the list.

The function SUM-LIST returns the sum of all numbers in a list variable.

The function MIDNIGHT takes a timestamp and returns a timestamp for midnight of that day.

The specific data structure used in a given implementation, along with the particular expression language used and the degree of flexibility desired, will indicate which of the above functions and which additional functions should be introduced to the resource sponsor for use in customizing the attribute and list rules.

One advantage of the methods described above is that the record server, records, and user lists may be administered by a third party which provides these content management tools as a service to the sponsor. The sponsor is afforded significant flexibility in customizing the key-value pairs, the user attributes, and the user lists without the sponsor necessarily having direct access to the record server or the recorded data.

Where a third party is administering the content distribution services involving the records and user lists, the underlying data—that is, the individual records and the specific events that cause records to be modified—may not be visible to the content owner taking advantage of the services. Using the tools described in this disclosure, a sponsor can design and implement a content distribution strategy based on the sponsor's content and specified user behaviors at a relatively high level, thus greatly increasing the accessibility of these strategies to businesses that may not have the infrastructure to maintain these systems themselves.

Figure 6:
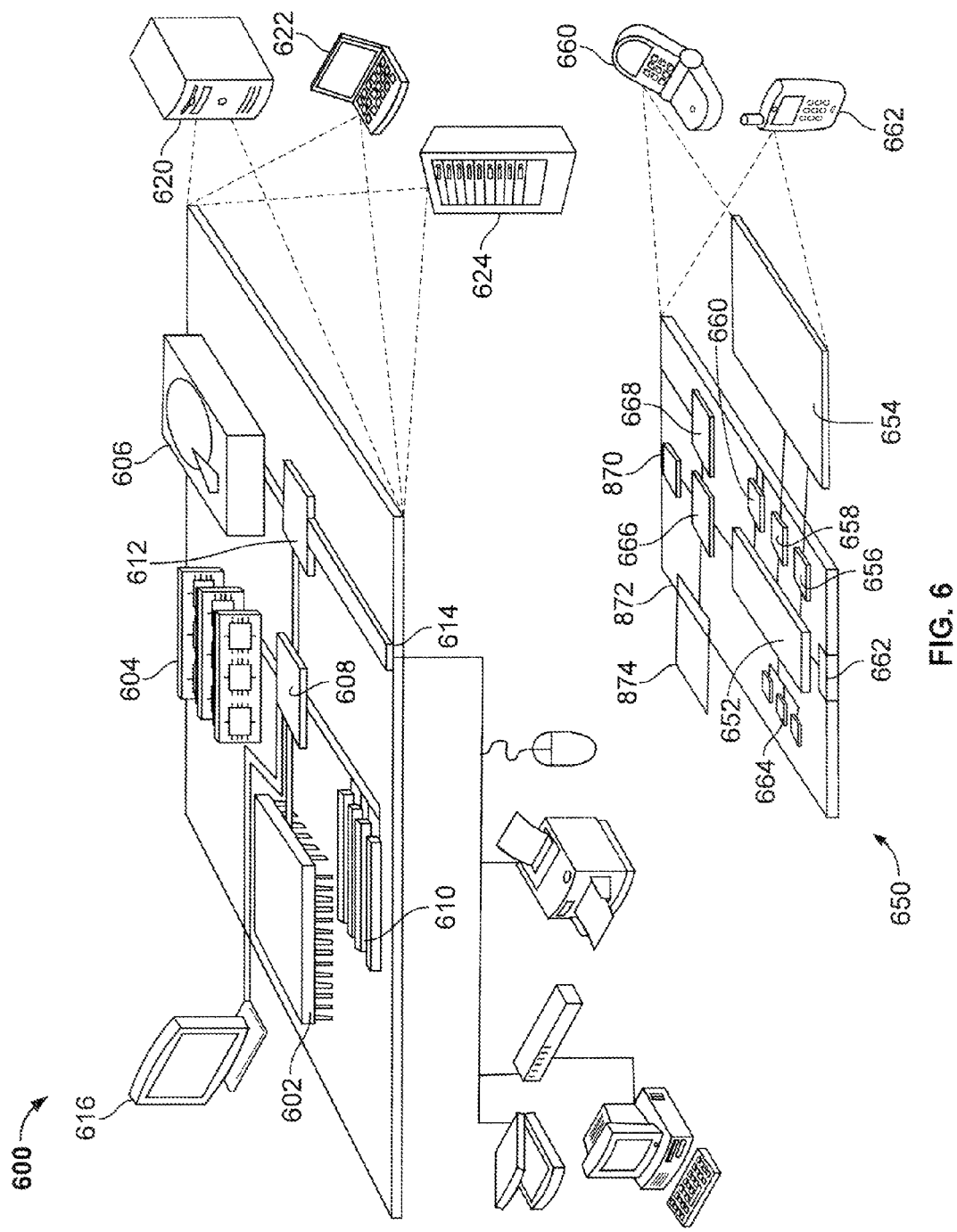
FIG. 6 shows an example of a generic computer device and a generic mobile computer device, which may be used with the techniques described here.

FIG. 6 shows an example of a generic computer device 600 and a generic mobile computer device 650, which may be used with the techniques described here.

Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, tablet computers and other similar computing devices. The components shown here, their connections and relationships, and their functions, are meant to be exemplary only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving data as a result of a smart pixel executing when a resource is rendered and presented to a user, the received data including a user identifier associated with the user and one or more key-value pairs associated with the user's access of the resource, each key-value pair including a key and a value provided by the resource, wherein the key-value pairs are specified by a sponsor of the resource, and wherein the values are determined based on information included in the resource as presented at a time of rendering;
   receiving, prior to presentation of the resource to the user, one or more rules for evaluating the received data including one or more rules associated with a first user list, the first user list including a plurality of entries, each entry including a user identifier that is associated with a user that has been determined to satisfy the one or more rules;
   determining, by one or more processors, that the received data satisfies the one or more rules associated with the first user list comprising user identifiers;
   adding the user identifier to the first user list based on the determination that the received data satisfies the one or more rules;
   managing the first user list over time including adding and removing users based on subsequent receipt of data when the smart pixel or other smart pixels associated with the sponsor of the resource are executed; and
   remarketing content to users based on their inclusion in the first user list wherein remarketing does not include providing content to the resource in response to receiving the data and wherein remarketing includes selecting content to be served to users included in the first user list based on subsequent requests for content that are received from user devices associated with a respective user after their inclusion in the first user list.

2. The method of claim 1, further comprising:
   receiving instructions from a sponsor of the resource to modify the one or more rules associated with the user list;
   generating modified rules based on the received instructions; and
   determining whether to remove the user identifier associated with the received data from the user list based on whether the received data satisfies the modified rules.

3. The method of claim 1,
   wherein the resource comprises content served over the Internet; and
   wherein the key-value pairs included in the received data are defined within the source code of the resource.

4. The method of claim 1,
   wherein the received data is included within a client request for content associated with the resource.

5. The method of claim 1, further comprising:
   receiving a request for content, the request associated with a user identifier;
   determining that the user identifier is included in the user list; and
   selecting and serving content based on determining that the user identifier is included in the user list.

6. The method of claim 5, further comprising:
   associating the received data with a timestamp;
   determining that an age of the timestamp of the received data exceeds a threshold age; and
   removing the user identifier from the user list based on the determination that the age of the timestamp exceeds the threshold age.

7. The method of claim 6, wherein the threshold age is a predetermined threshold value associated with the user list.

8. The method of claim 1, further comprising:
   generating and storing a value for an attribute associated with the user identifier, the attribute storing one or more values associated with the user identifier based on applying one or more rules to specified key-value pairs.

9. The method of claim 8, wherein the value of the attribute represents a number of times the user has accessed the resource within a predetermined period of time.

10. The method of claim 8, wherein the value of the attribute represents a category of resources accessed by the user.

11. A system comprising:
    one or more computers and one or more storage devices storing instructions that are operable, when executed by the one or more computers, to cause the one or more computers to perform operations comprising:
      receiving data as a result of a smart pixel executing when a resource is rendered and presented to a user, the received data including a user identifier associated with the user and one or more key-value pairs associated with the user's access of the resource, each key-value pair including a key and a value provided by the resource, wherein the key-value pairs are specified by a sponsor of the resource and the values are determined based on information included in the resource as presented at a time of rendering;

receiving, prior to presentation of the resource to the user, one or more rules for evaluating the received data including one or more rules associated with a first user list, the first user list including a plurality of entries, each entry including a user identifier that is associated with a user that has been determined to satisfy the one or more rules;

determining that the received data satisfies the one or more rules associated with the first user list comprising user identifiers;

adding the user identifier to the first user list based on the determination that the received data satisfies the one or more rules;

managing the first user list over time including adding and removing users based on subsequent receipt of data when the smart pixel or other smart pixels associated with the sponsor of the resource are executed; and remarketing content to users based on their inclusion in the first user list wherein remarketing does not include providing content to the resource in response to receiving the data and wherein remarketing includes selecting content to be served to users included in the first user list based on subsequent requests for content that are received from user devices associated with a respective user after their inclusion in the first user list.

12. The system of claim 11, the operations further comprising:
receiving instructions from a sponsor of the resource to modify the one or more rules associated with the user list;
generating modified rules based on the received instructions; and
determining whether to remove the user identifier associated with the received data from the user list based on whether the received data satisfies the modified rules.

13. The system of claim 11,
wherein the resource comprises content served over the Internet; and
wherein the key-value pairs included in the received data are defined within the source code of the resource.

14. The system of claim 11,
wherein the received data is included within a client request for content associated with the resource.

15. The system of claim 11, the operations further comprising:
receiving a request for content, the request associated with a user identifier;
determining that the user identifier is included in the user list; and
selecting and serving content based on determining that the user identifier is included in the user list.

16. The system of claim 15, the operations further comprising:
associating the received data with a timestamp;
determining that an age of the timestamp of the received data exceeds a threshold age; and
removing the user identifier from the user list based on the determination that the age of the timestamp exceeds the threshold age.

17. The system of claim 16, wherein the threshold age is a predetermined threshold value associated with the user list.

18. The system of claim 11, the instructions further operable to perform operations further comprising:
generating and storing a value for an attribute associated with the user identifier, the attribute storing one or more values associated with the user identifier based on applying one or more rules to specified key-value pairs.

19. The system of claim 18, wherein the value of the attribute represents a number of times the user has accessed the resource within a predetermined period of time.

20. The system of claim 18, wherein the value of the attribute represents a category of resources accessed by the user.

21. A non-transitory computer-readable medium storing software comprising instructions executable by one or more computers which, upon such execution, cause the one or more computers to perform operations comprising:
receiving data as a result of a smart pixel executing when a resource is rendered and presented to a user, the received data including a user identifier associated with the user and one or more key-value pairs associated with the user's access of the resource, each key-value pair including a key and a value provided by the resource, wherein the key-value pairs are specified by a sponsor of the resource, and wherein the values are determined based on information included in the resource as presented at a time of rendering;

receiving, prior to presentation of the resource to the user, one or more rules for evaluating the received data including one or more rules associated with a first user list, the first user list including a plurality of entries, each entry including a user identifier that is associated with a user that has been determined to satisfy the one or more rules;

determining that the received data satisfies one or more rules associated with the first user list comprising user identifiers;

adding the user identifier to the user list based on the determination that the received data satisfies the one or more rules;

managing the first user list over time including adding and removing users based on subsequent receipt of data when the smart pixel or other smart pixels associated with the sponsor of the resource are executed; and remarketing content to users based on their inclusion in the first user list wherein remarketing does not include providing content to the resource in response to receiving the data and wherein remarketing includes selecting content to be served to users included in the first user list based on subsequent requests for content that are received from user devices associated with a respective user after their inclusion in the first user list.

22. The medium of claim 21, the operations further comprising:
receiving instructions from a sponsor of the resource to modify the one or more rules associated with the user list;
generating modified rules based on the received instructions; and
determining whether to remove the user identifier associated with the received data from the user list based on whether the received data satisfies the modified rules.

23. The medium of claim 21,
wherein the resource comprises content served over the Internet; and
wherein the key-value pairs included in the received data are defined within the source code of the resource.

24. The medium of claim 21,
wherein the received data is included within a client request for content associated with the resource.

25. The medium of claim 21, the operations further comprising:
receiving a request for content, the request associated with a user identifier;

determining that the user identifier is included in the user list; and selecting and serving content based on determining that the user identifier is included in the user list.

26. The medium of claim 25, the operations further comprising:

associating the received data with a timestamp;

determining that an age of the timestamp of the received data exceeds a threshold age; and removing the user identifier from the user list based on the determination that the age of the timestamp exceeds the threshold age.

27. The medium of claim 26, wherein the threshold age is a predetermined threshold value associated with the user list.

28. The non-transitory computer-readable medium of claim 21, further comprising instructions to perform operations further comprising:

generating and storing a value for an attribute associated with the user identifier, the attribute storing one or more values associated with the user identifier based on applying one or more rules to specified key-value pairs.

29. The medium of claim 28, wherein the value of the attribute represents a number of times the user has accessed the resource within a predetermined period of time.

30. The medium of claim 28, wherein the value of the attribute represents a category of resources accessed by the user.

* * * * *